United States Patent
Silbiger (12)

(10) Patent No.: US 6,284,838 B1
(45) Date of Patent: *Sep. 4, 2001

(54) BIODEGRADABLE COMPOSITION

(75) Inventor: Jakob Silbiger, Basel (CH)

(73) Assignee: Novamont S.p.A., Novara (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/242,263

(22) PCT Filed: Aug. 5, 1997

(86) PCT No.: PCT/CH97/00292

§ 371 Date: May 17, 1999

§ 102(e) Date: May 17, 1999

(87) PCT Pub. No.: WO98/06785

PCT Pub. Date: Feb. 19, 1998

(30) Foreign Application Priority Data

| Aug. 12, 1996 | (CH) | 1967/96 |
| Oct. 31, 1996 | (CH) | 2687/96 |
| Dec. 9, 1996 | (CH) | 3015/96 |
| Jan. 6, 1997 | (CH) | 0013/97 |

(51) Int. Cl.$^7$ .............................. C08L 97/00; C08L 97/02; C08L 89/00
(52) U.S. Cl. .............................. 525/54.4; 524/13; 524/17; 524/18; 524/22; 524/23; 524/25; 524/26; 524/47; 524/72; 524/76
(58) Field of Search .............................. 525/54.4; 524/13, 524/17, 18, 22, 23, 25, 26, 47, 72, 76

(56) References Cited

U.S. PATENT DOCUMENTS

| 2,355,180 | 8/1944 | Remy | 106/123 |
| 5,389,322 | 2/1995 | Kim et al. | 264/112 |
| 5,693,131 | * 12/1997 | Wunning et al. | 106/123.12 |

FOREIGN PATENT DOCUMENTS

| 4331747 | 9/1993 | (DE) . |
| 9508594 | 3/1995 | (WO) . |
| 9614361 | 3/1996 | (WO) . |

* cited by examiner

*Primary Examiner*—Nathan M. Nutter
(74) *Attorney, Agent, or Firm*—Ladas & Parry

(57) ABSTRACT

A biodegradable composition, is obtained by heating a melting together at least one lignin and/or a lignin containing material with a protein. This composition may contain one or more additives. Also disclosed are articles produced with this composition.

25 Claims, No Drawings

BIODEGRADABLE COMPOSITION

BIODEGRADABLE COMPOSITION

The present invention refers to a biodegradable composition, which contains a lignin and/or a lignin-containing material and a protein, said composition being useful for the production of biodegradable shaped articles, for example throw-away articles, advertising articles, labels, cups, flower-pots, reels of thread, candle-cups, and the like as well as films, or foamed articles. The invention also refers to the articles, which are made from a material according to the present invention.

Lignin is a biodegradable raw material which is found abundant in nature. Lignin is a cell-wall material of wood, straw, and like materials and is obtained as a side-product when these materials are processed, especially in the production of wood-cellulose, which is the starting material for the paper industry. On the basis of the different processes used to isolate lignin, and the different types of lignin obtained therewith, lignin is named mainly as sulphate-lignin, or Kraft-lignin, sulphonate-lignin, organosolv-lignin which is obtained by extraction with organic solvents, like ethanol, or n-butanol, lignin which has been obtained by treatment with water vapour, or acid-hydrolysed lignin. The different processes to produce these lignins are the lignins obtained therewith have been described in the literature. All these lignins may be used for production of the compositions as defined herein later on.

For the use according to the present invention the lignin need not be relatively pure and isolated. It suffices to use directly a lignin containing material. It is possible to use wood or another lignin containing material directly, as a natural renewable raw-material, in place of isolated lignin. In sawmills wood is obtained in the form of sawdust in different sizes. Often boughs, branches of trees or bushes are treated in a shredder to produce small pieces. These materials may be used directly to produce shaped articles. In this sense, the present invention refers also to use of lignin containing materials, preferably in the form of small or fine particles, preferably in the form of small particles, optionally together with separately produced relatively pure lignin, to produce shaped articles which are dimensionally stable, yet biodegrade in nature. Proteins, lignins and lignin containing materials are well compatible and adhere well with each other chemically or physically when used according to the present invention. This yields good products which may be produced easily and are reproducible.

Articles made from biodegradable materials are known. The biodegradable materials according to the present invention are, compared with known materials, cheap and simply to make, for example in melt-processing by compression-molding by extrusion, or by injection molding. This depends on the selected composition. Products are obtained with very good properties having a high stability against humidity so that the physical properties remain stable within a large humidity range. Articles made therefrom have a natural color and according to the chosen composition for example also the natural color of wood which is very attractive. Compositions according to the present invention containing lignin, a protein and optionally a flame retardant have excellent self-extinguishing properties. The have an excellent price/performance ratio, which is an important factor for the commercial success.

The present invention is defined in the claims. The present invention especially refers to a biodegradable composition, which is characterized in that said composition has been obtained by heating and melting together at least one lignin and/or a lignin containing material with a protein, and that said composition optionally contains one or more additives, whereby said additives are selected from the group of modifying agents, alkenol polymers, fillers, lubricants, plasticizers, thermoplastic polymers, stabilizers, flame retardants, dyestuffs, nucleating agents, foaming agents, pigments and mixtures thereof. The weight ratio of the dry lignin and/or the dry lignin containing material on the one side to the dry protein on the other side in said composition is preferably from 99.95:0.05 to 20:80, preferably from 99.95:0.05 to 40:60, preferably from 98:2 to 60:40, and preferably from 97:3 to 75:25.

the present invention further refers to a starting composition which on heating and melting yields a composition according to the present invention, which is characterized in that said starting composition contains the following components: (i) a lignin and/or a lignin containing material; (ii) a protein which optionally has been deprotonated and (iii) optionally one or more additives which are selected from the group comprising of modifying agents, alkenol polymers, fillers, lubricants, plasticizers, thermoplastic polymers, stabilizers, flame retardants, dyestuffs, nucleating agents, foaming agents, pigments and mixtures thereof, wherein the weight ratio of the dry lignin and/or the dry lignin containing material on the one side to the dry protein on the other side in said composition preferably is form 99.95:0.05 to 20:80, preferably from 99.95:0.05 to 40:60, preferably from 98:2 to 60:40, and preferably from 97:3 to 75:25.

The composition may, depending on the chosen composition, by present in the form of a powdery mixture, a spray dried powder, a melt or a shaped article made thereof.

it is to be assumed that the lignin and the protein associate or bind together so that after heating a lignin/protein reaction product is obtained. This especially is the case, if a deprotonated protein is used as described further on. If a lignin containing material is used, for example wood, which is further in this text used as an expression including also other lignin containing materials, it may also be assumed that on heating, the protein associates with or binds itself to the reactive groups of the lignin which is contained in the wood. This may especially be assumed if deprotonated gelatine is used. On the basis of the increase of the viscosity of the mixture while processing it appears that a cross-linking reaction takes place. However, this explanation shall not limit the present invention.

If for example lignin and gelatine or deprotonated gelatine is mixed in a kneader at elevated temperature, a homogenous melt is formed initially, whereby on continued processing the viscosity of the composition increases. By cooling the composition it is possible to stop this increase resp. the cross-linking. By this it is possible to work with a two or multi-step process and initially produce a composition which is not cross-linked or only cross-linked to a low degree which in a further step is worked into the finished article. If the used granulate consists mostly of lignin and a protein then preferably a heated press is used for producing shaped articles as by the continuing cross linking and increasing viscosity an extruder or an injection moulding machine could be blocked. The selection of the apparatus to produce of the shaped article depends of the type of composition and presents no problem to the expert.

In order to produce the composition of the present invention it is convenient to mix the lignin and/or the lignin containing material with the protein, optionally under heating and subsequently adding the additives. It is also possible to mix the additives together with the lignin and/or the lignin containing material and heating the mixture. Preferably a granulate is produced initially, wherein the lignin and/or the lignin containing material is not crosslinked or pre-crosslinked with the protein. The granulate may then be mixed with further additives and processed to a shaped article applying heat.

If wood is used in the mixture it is possible to impregnate the wood with the protein and optionally with the lignin and further additives so that a granulate is obtained which can be processed under heat to yield a shaped article. Preferably the impregnated product is made from a wood containing of small particles. Such a wood is for example sawdust, as is obtained by sawing wood. Wood in small particles is also obtained by chipping or shredding wood for examples as wood shavings.

The weight ratio of the dry lignin containing material to the dry protein is preferably the same as mentioned above for the ratio of lignin to the protein. It is however possible to chose other weight ratios, for example a weight ratio of from 99.95:0.05 to 70:30, preferably 98:2 to 80:20, or 97:3 to 90.5:9.5.

The lignin component of the composition may be lignin only or a mixture of lignin and lignin containing material or a lignin containing material alone, depending of the type of article to be produced, its use and color and other properties and the processing method to be applied. The ratio of the components in the mixture depends mainly on the product properties of the final product. An important function are the degree of the cross-linking and the additives. By adding plasticisers and other additives, especially thermoplastic polymers, as described further on, the properties of the described compositions may be optimised and not represent a problem to the expert in the art.

As lignin all the lignins may be used for example lignin made from wood of fir-wood, spruce, oak-tree, aspen, pine-tree or from straw or similar materials and is present in the form of sulfate-lignin or Kraft-lignin, sulphonate-lignin, organosolv-lignin, lignin which has been treated under vapor pressure and acid-treated lignin. Lignins which contain no sulphur are preferred. These also have together with lignin somewhat different properties. Depending on the required properties of the finished product, especially with reference to the mechanical properties. the water-resistance resp. water-solubility or color, it is possible that a sulphur containing lignin is preferred. Same types of lignin may have different properties depending on their origin. This is a problem of optimisation. All types of wood as well as other lignin containing materials may be equally used to produce the composition according to this invention. Preferred is wood.

The expression "lignin" as used herein comprises chemically modified lignin, for example alkoxylated lignin, such as ethoxylated or propoxylated lignin, which has been obtained by treating lignin with ethylene oxide or propylene oxide in an alkaline medium. Such lignin derivatives are known.

The protein as used according to this invention is preferably a vegetable or a animal protein an known per se, such as collagen, gelatine or case in, however, all proteins which are commercially available may be used. The expression "protein" includes also chemically modified, i.e. derivatives of proteins, for example proteins modified with acrylic acid or methacrylic acid or with glycidyl methacrylate, where from said derivatives of gelatine are preferred. These may be cross-linked by electron- or UV-light. Such derivatised proteins are known. The used protein preferably contains about 5% by weight of water, calculated to the weight of the dry protein, preferably about 6% by weight to 20% by weight water or more, preferably 8% by weight to 18% by weight. It is also possible to use proteins with less than 5% by weight of water resp. proteins which are essentially free of water. Preferred are gelatine and derivatives of gelatine.

Lignin and and/or lignin containing materials may be processed with proteins in different ways, as described above, to yield the compositions according to the present invention. The melting together of the components can be realised within a wide temperature range, i.e. from about 80° C. to about 260° C. Preferred is a range from 100° C. to 200° C., preferably from 100° C. to 170° C. and preferably from about 120° C. to 165° C., optionally together with the additives as named herein. The softening point resp. the melting point of lignin depends on the molecular weight and the production method of the lignin and is at about 80° C. to about 145° C. Lignin mixed with protein may be processed at temperatures within the range of 80° C. to 100° C. The components may be molten together in a mixer or kneader at the mentioned temperatures whereby preferably a granulate is produced. It is also possible to melt the components in an extruder and subsequently granulate the melt, whereby process conditions and composition are to chosen such that the extruder is not blocked.

A special embodiment of the present invention is that a deprotonated protein is used, i.e. a protein which has been deprotonated at elevated acid value ($p_H$). Proteins are polypeptides which contain carboxyl groups as well as amino groups as side chains in the same molecule. Proteins therefore are amphoteric and have an isoelectric point at which the number of negative charges and the number of positive charges present in the same molecule are equal. Gelatine for example, depending on the method of its production, has its isoelectric point at the acid value ($p_H$) of about $p_H$ 4.7 to $p_H$ 5.0. The acid groups present in gelatine molecule are neutralised at about $p_H$ 1.5 to $p_H$ 6.5, whilst the different kinds of amino groups are deprotonated in the range of $p_H$ 8 to $p_H$ 11.5. This means that at $p_H$ 6.5 practically all carboxyl groups are being neutralised. Deprotonation of certain amino groups starts at $p_H$ 8 whereby all the amino groups are being deprotonated at $p_H$ 11.5. Deprotonated polypeptide contain free and reactive electrons which are able to associate and to react with lignin. The higher the degree of deprotonation the stronger will be the reaction of the protein with the lignin thereby modifying the lignin. The ratio of the components within the composition of the lignin/protein reaction product may be optimised according to the required properties of the final product such as mechanical properties, water resistance or color. The protein used in the composition has preferably been deprotonated at least at $p_H$ 8, preferably at $p_H$ 10 and preferably at $p_H$ 11.5 whereby at $p_H$ 11.5 the protein will be completely deprotonated. The deprotonated protein is, with reference to carboxyl group contained in the protein, preferably a alkali- or earth alkali salt, preferably a sodium or potassium salt. It is obtained by treating the protein with the respective alkali or earth alkali salt in a n aqueous medium, for example with sodium hydroxide or potassium hydroxide or the respective carbonates or bicarbonates. The preferred weight ratio of the dry lignin and/or lignin containing material on the one side to the deprotonated lignin (calculated to the dry substance) on the other side have been indicated above. Weight ratios of form 97:3 to 88:15 and from 97:3 90.5:9.5 may also be used.

The present invention therefore refers also a biodegradable composition, which is characterized in that said composition is obtained by heating and melting together of at least one lignin and/or lignin containing material with a deprotonated protein, and that said composition optionally contains one or more of the additives as mentioned above.

For producing the composition containing deprotonated protein, the analogous procedure is used as described above for compositions containing non-deprotonated protein. The deprotonated protein is mixed with the lignin or the lignin containing material whereby the optional additives are added immediately or subsequently. The mixture is then molten to a uniform mixture and optionally granulated. This can be made depending on the selected composition for example in kneader, mixer or extruder. The deprotonated protein may also be produced in situ during the mixing process resp. melting process by adding to the starting mixture which contains non-deprotonated protein, dry or aqueous alkali hydroxide, earth alkali hydroxide, alkali carbonate or earth alkali carbonate. Any excess of alkali in the reaction product is preferably neutralised for example by the addition of lignin or a lignin containing material, for example wood or by adding a polybasic acid, for example tartaric acid or citric acid. The acid value ($p_H$) of the composition produced in this manner is preferably neutral and is preferably within the range of 6.5 to 7.5.

It is possible to dissolve the protein as well as the lignin at higher acid value in water and adding the optional additives and subsequently processing the mixture obtained. By using this method a more intensive reaction of the components is obtained.

Cross-linking the lignin component with the protein component has the effect that the composition is hardened. In this manner preferably a non-cross-linked or partially cross-linked mixture resp. a non hardened or a partially hardened mixture is produced initially preferably in the form of a granulate, which in a further step is processed to yield the final cross-linked resp. hardened product. It is possible to produce in a first step an aqueous starting mixture containing the starting materials in a dissolved, dispersed and/or emulsified form, subsequently drying this mixture, preferably by spay-drying, whereby a dry resp. spray-dried granulate is obtained. This granulate may in a further step be cross-linked to yield a finished article. If this starting mixture contains a filler, such as cellulose fibres and/or a lignin containing material, such as wood, preferably sawdust, then an impregnation product is obtained, preferably an impregnated wood, preferably spray dried sawdust which can be further formed to shaped articles. The present invention therefore refers to a method of producing an impregnated granulate, said granulate being preferably spray-dried, which is characterized, that in a first step (i) an aqueous starting mixture is made, in which the staring materials are present in a dissolved, dispersed and/or emulsified form whereby said starting mixture preferably contains a filler and/or a lignin containing material, preferably wood, and that (ii) said starting mixture is dried, preferably spray-dried, so that a granulate, preferably a spray-dried granulate, is formed wherein the lignin component and the protein component are not crosslinked or only crosslinked to small degree, so that the final cross-linking step resp. the hardening step can be carried out in a second step, i.e. when the shaped article is formed. The present invention also refers to the granulate made by said method as well as the shaped articles made from such a granulate. By this method it is possible to make relatively light foam-like articles, which biodegrade relatively quickly.

The composition according to this invention, as obtained by heating and melting together of at least one lignin and/or lignin containing material with an optionally deprotonated protein, as described herein above, can be used as such and be processed into shaped articles. The composition may contain additives, which are named above as component (iii). If the composition contains one or more additives, then the sum of the components by weight of the lignin component and the protein component calculated to the total weight of the composition is at least 20%, preferably at least 40% and preferably at least 50%, preferably at least 60%, preferably at least 80%, calculated each time to the dry substance.

The dry substance of all the additives named as component (iii) in the composition is 0.2 to 80% by weight, preferably 2 to 60% by weight, preferably 5–50% by weight or 5 to 40% by weight, calculated to the total weight of the composition.

The alkenol polymers as mentioned according to this invention are partially hydrolysed polyvinyl acetates with a degree of hydrolysis of from about 50 mol % to 100 mol %, preferably form about 65 mol % to 100 mol %. These polymers are know as polyvinyl alcohols and are, depending on their degree of hydrolysis, water-soluble. Water soluble polyvinyl alcohols in their pure state are normally not thermoplastic and therefore are processed together with known plasticisers. Preferred polyvinyl alcohols are those with a degree of hydrolysis of 75–99 mol %, preferably 87–98 mol %, especially 75–89 mol % and 96–99 mol % and an average molecular weight of about 15'000 to 240'000, preferably 15'000 to 180'000, preferably 40'000 to 110'000, preferably 40'000 to 80'000 due to their biodegradability characteristics. The alkenol polymers are sued preferably in a concentration of from 5–40% by weight, preferably 5–30% by weight, preferably 10–25% by weight, calculated to the total weight of the composition.

Suitable filters include, for example oxides of magnesium, silicon and aluminum, chitosan, cellulose fibres, cellulose esters, cellulose ethers, starch esters, starch ethers, hydroxyalkyl cellulose, hydroxyalkyl starch, ceramic powder. Wood is a lignin containing material and is used as described above. If wood is used in a comparatively large excess, it is possible to consider wood also as a filler material. As such preferably wood powder, such as sawdust, is used. The fillers are present at a concentration of 3–50% by weight, preferably 5–30% by weight, preferably 5–15% by weight, based on the total weight of the composition.

Lubricants include for example stearates of aluminum or magnesium, lecithins and mono- and diglycerides, which are present in a concentration of form 0.5% to 5% by weight, preferably 0.7% to 1.5% by weight.

Plasticisers include for example poly(alkylene oxides), preferably poly(ethylene glycols) or poly(propylene glycols), ethylene glycol, propylene glycol, sorbitol, glycerol, low-molecular weight glycerins, glycerol monoacetate, diacetate, or triacetate; urea; pentaerythritol, triethyl citrate, tributyl citrate, fatty alcohols such as stearyl alcohol and further known plasticisers. which are present at a concentration of between 0.5% and 40% by weight, and more preferably between 0.5% and 25% by weight, preferably between 1.0% and 15% by weight or between 1.0% to 10% by weight.

Synthetic thermoplastic polymers are preferably selected form the group consisting of polyolefines, such as polyethylene or polypropylenes, poly(vinyl acetates) and partially hydrolysed poly(vinyl acetates) with a degree of hydrolysis of 10 mol % to 50 mol %, polystyrenes; poly(acrylic acid) esters or poly(methacrylic acid) esters, thermoplastic polycondensates, preferably polyesters, polyamides, polyester amides, poly(amide anhydride); alkylene/acrylic acid copolymers or alkylene/methacrylic acid copolymers, preferably ethylene/acrylic acid copolymers; alkylene/maleic anhydride copolymers; alkylene/vinylalcohol copolymers. Such polymers are known. Preferred copolymers from the group of ethylene/acrylic acid copolymers are those which contain the carboxyl group partially in salt form, preferably as sodium or potassium salt.

The thermoplastic polymers and copolymers as mentioned herein are preferably water-insoluble, i.e. they dissolve less than 5% by weight, preferably less than 3% by weight, and preferably less than 2% by weight in water at room temperature (20° C.).

Preferably the composition contains these polymers and copolymers in a total concentration of 0.2–70% by weight, preferably 0.5–50% by weight, preferably 0.5–30% by weight or 0.5–20% by weight, preferably 1–10% by weight, calculated to the total weight of the composition.

Preferred are biodegradable polymers. Preferred polyamides are known biodegradable polyamides, polyester amides and poly(amid anhydrides). Preferred copolymers and ethylene/acrylic acid copolymers and ethylene/vinyl alcohol copolymers. Preferred biodegradable thermoplastic polyesters are polymers derived from aliphatic hydroxycarbonic acids with 1 to 24 carbon atoms, which for example are made from the corresponding hydroxy-carbonic acids or the corresponding lactones or lactides. The preparation of such polyesters is known per se. Such preferred thermoplastic polyesters are preferably homopolymers as derived from alpha-hydroxy-carbonic acids such as polyglycolic acids; homopolymers made from lactic acid or the corresponding lactide; or from beta-hydroxy-carbonic acids, preferably from beta-hydroxy-propionic acid resp. beta-propiolactone or beta-hydroxy-butyric acid (poly-beta-hydroxy-butyrate); from gamma-hydroxy-carbonic acids, for example gamma-hydroxy-butyric acid resp. from gamma-butyrolactone or from gamma-valerolactone; from epsilon-hydroxy carbonic acids, such as 6-hydroxy-carbonic acid resp. the corresponding epsilon-caprolactone which yields poly-epsilon-caprolactone. Preferred are polymers made from lactic acid, gamma-hydroxy-butyric acid, gamma-valerolactone and epsilon-caprolactone. Preferred is poly-epsilon-caprolactone.

Preferred thermoplastic copolymers are poly-hydroxybutyrate/valerate as well as copolymers made from hydroxycarbonic acids as mentioned in the preceding paragraph with aliphatic or aromatic diisocyanates, such as hexamethylenediisocyanate. Other copolymers are known and can be used according to requirements. Block-copolymers containing one of the hydroxy-carbonic acids, such as beta-hydroxybutyrate may also be used.

Homopolymers and copolymers made from hydroxycarbonic acids have a softening point preferably between 50° C. and 170° C., preferably at 60° C. or higher and an average molecular weight of about 40'000 or higher.

For the production of thin-walled, for example films (often called foils), it is preferred that the weight ratio of the lignin=protein component on the one side to the homopolymer and/or copolymer on the other side within the total composition generally is 1:3 to 2:1 and preferably 1:2 to 1:1. The weight of the lignin/protein-component and the polymer or polymers of the hydroxy-carbonic acids in total, especially for the production of films, in the total composition is 30–90%, preferably 35–80% by weight, preferably 40–70% by weight, calculated to the dry weight of the total composition.

Preferred from the group of alkylene/vinylalcohol copolymers are ethylene/polyvinyl alcohols, preferably with a molar vinyl alcohol content of at least 50 mol %, preferably at least 58 mol %. Most preferred is a vinylalcohol content between 65 mol % and 85 mol %. Alkylene/vinylalcohol copolymers are used preferably together with the mentioned polyvinyl alcohols in a weight ratio of 4:1 to 1:4, preferably 2:1 to 1:2. Preferred are those synthetic polymers with a softening point of 260° C. or lower, preferably of 220° C. or lower, most preferably between 110° C. and 210° C. or lower. Polycaprolactones can be processed at temperatures as low as 60° C., so that the lower temperature limit of the polymers is, depending on the choice, at about 60° C.

A part of the lignin within the lignin/protein component may be replaced by starch so that a lignin/starch/protein component is obtained. It is assumed that starch associates with protein in a different form than lignin. The term "lignin/protein component" includes also the lignin/starch/protein component. The total weight of lignin and starch in the lignin/protein component corresponds to the value given above for the lignin part within the lignin/protein component containing lignin only. In replacing lignin partially by starch, the ratio of lignin to starch is preferably 10:1 to 1:10, preferably 8:1 to 3:1 and preferably 5:1 to 1:1.

The term "starch" as used herein comprises starches of vegetable origin, which starches are for example derived from potatoes, wheat, corn, oats, rice, and other starch containing plants. Such starch is composed primarily of amylose and amylopectin. Potato starch regularly contains about 30% by weight of amylose whereas certain kinds of maize for example may contain 75% by weight of amylose or more or may consist almost entirely of amylopectin. The compositions of the present invention may be produced with all starches of this kind. Preferred are maize starch and potato starch.

The term "starch" as used herein also comprises chemically modified starches, for example starch esters, preferably starch acetates, provided that the reactivity of the starch derivative is not reduced to such a degree that the derivative is not able any more to associate with the protein, preferably with the deprotonated protein, which generally is the case when the degree of substitution of the starch derivative does not exceed 0.05.

Modifiers are for example acid anhydrides of carbonic acids and poly-carbonic acids such as the anhydrides of acetic acid, propionic acid, butyric acid, valeric acid, stearic acid, tartaric acid, benzoic acid, phthalic acid; epichlorohydrin, epoxy compounds, aldehydes such as formaldehyde, acetaldehyde, propioaldehyde, butyraldehyde, valeraldehyde, capronaldehyde, stearylaldehyde, crotonaldehyde, benzaldehyde, furfurol. These modifiers are capable of reacting with the lignin and/or protein and may cross-link the components, especially under the influence of heat. Modifiers are also compounds which under the influence of light, especially electron rays or UV-light, optionally in the presence of known activators, cross-link the protein. Modifiers are used preferably in concentrations of 0.1–6% by weight, preferably 2–5% by weight, calculated to the weight of the protein.

Stabilisers are for example known antioxidants, UV-absorbers or UV-quenchers or bactericides or fungicides and are used in known quantities.

Flame retardants are known per so. They contain phosphorous, sulphur or halogen and are present in an amount of from 0.1% to 10% by weight, preferably 1% to 6% by weight, most preferably 2% to 4% by weight based on the total weight of the composition. The particularly preferred flame retardants are guanidinium phosphate, ammonium polyphosphate, ethylenediamine-polyphosphate (optionally in the presence of disodium orthophosphate), guanidinium sulphate and/or ammonium sulphate. These compounds are present in the composition in the amount as indicated above. Lignin and protein together with a small amount of flame retardant an excellent self-extinguishing composition.

The coloring agents used in the present invention are preferably known biodegradable colors and used in known concentrations. Nucleating agents are for example the fillers as mentioned herein above, or magnesium silicate (micro-talcum) with an average particle size of about 0.1 to 5 microns, and in a concentration of about 0.1% to 3% by weight, preferably 0.1% to 0.5% by weight.

Foaming agents are generally known. Examples are a combination of sodium bicarbonate and citric acid and similar foaming agents which are commercially available. It is also possible to add gaseous carbon dioxide directly to the molten composition into the extruder barrel during extrusion. Foamed materials often are used as packaging materials, in loose or in tailored form, for example for pharmaceutical ampoules. The composition according to the present invention is also useful for producing such foams. The foaming agent is added in concentrations preferably between 0.1% to 0.2% by weight based on the weight of the composition.

The composition of this invention can be processed in conventional manner using, for example, conventional machinery useful for compression molding, injection molding, blow molding, extrusion and coextrusion (rod, pipe and film extrusion), or vacuum molding to produce known articles. The articles include for example advertising (throw away) articles, labels, cups, flower pots, thread spools, candle cups, holding devices, bottles, table-ware, cutlery, and similar articles, packaging materials like sheets, films, laminated films sacks, bags, foams, pipes, rods, granules or powders. The following examples illustrate the invention.

EXAMPLE 1 a) 5 parts of commercial gelatine (100 bloom, isoelectric point at $p_H$ 4.9) are given into a mixer together with 35 parts of water. To the aqueous gelatine obtained are added 60 parts or organosolv lignin and 5 parts of glycerin. The mixture is heated to 65° C. under stirring, cooled, dried to a water content of 18%, and granulated. The granulate was given into a heated press and kept for 10 minutes under pressure and at 150° C. A stable shaped article was obtained with good properties.

b) 5 parts of commercial gelatine (100 bloom, isoelectric point at $p_H$ 4.9) are given into a mixer together with 35 parts water. The mixture obtained is equilibrated to an acid value ($p_H$) of 11.5 by the addition of sodium hydroxide, 60 parts of organosolv lignin and 5 parts of glycerin are added. The mixture is heated to 65° C. while stirring and then treated as described in part a) of Example 1. Shaped articles with good properties are obtained.

EXAMPLE 2 a) 18 parts of commercial gelatine (150 bloom, isoelectric point at $p_H$ 4.9) are given into a mixer together with 200 parts of water. 42 parts of organosolv lignin are added. Then, 8 parts glycerin and 80 parts of sawdust are added under stirring and left for one hour. The product is isolated and left drying over night to a water content of 18% The powder obtained is given into a heated press and kept for 10 minutes under pressure and at a temperature of 160° C. A stable shaped article was obtained with good properties.

b) 18 parts of commercial gelatine (150 bloom, isoelectric point at $p_H$ 4.9) are given into a mixer together with 200 parts of water. The mixture obtained is equilibrated to an acid value ($p_H$) of 11.5 by the addition of sodium hydroxide. 42 parts of organosolv lignin. Then 8 parts of glycerin and 80 parts of sawdust are added. The mixture is further treated as described in part a) of this Example 2.

c) Example 2a) and Example 2b) are repeated with the difference that after the addition or organosolv lignin the acid value is again equilibrated to an acid value ($p_H$) of 11.5. The mixture is then stirred for 1 hour and 8 parts of sawdust are added. In the examples 2a), 2b) and 2c) there are obtained stable shaped articles with very good properties.

EXAMPLE 3 a) 18 parts of commercial gelatine (150 bloom, isoelectric point at $p_H$ 4.9) are given into a mixer together with 300 parts of water. 40 parts of organosolv lignin, 8 parts of glycerin and 60 parts of sawdust are added under stirring. The mixture is spray-dried whereby a granulate is obtained having a water content of 16%. The granulate may be formed in a heated press to stable shaped articles of various densities whereby the material is treated for 1 minute to 10 minutes at temperatures from 110° C. to 160° C. at pressures of from 1.1 bar to 10 bars.

b) 18 parts of commercial gelatine (150 bloom, isoelectric point at $p_H$ 4.9) are given into a mixer together with 300 parts of water. The mixture obtained is equilibrated to an acid value ($p_H$) of 11.5 by the addition of sodium hydroxide. 40 parts of organosolv lignin, 8 parts of glycerin and 60 parts of sawdust are added and spray dried to a granulate having a water content of 16%. The mixture is further treated as described in part a) of this Example 3.

EXAMPLE 4

To 50 parts of product obtained according to the Example 1a), 1b), 2a), 2b), 2c), 3a) and 3b) are added each time 12.5 parts or pre-plasticised polyvinyl alcohol (Example 4a) with an average molecular weight of 60'000 and a degree of hydrolysis of about 87–89 mol % and (Example 4b) with an average molecular weight of 108'000 and a degree of hydrolysis of about 98–99 mol %, and each time 5 parts of glycerin. The mixture is well mixed. The water content is 20% by weight calculated to the total weight of the mixture. The mixture is heated in a press for 5 minutes to 150° C. and in a further test for 10 minutes to 130° C. each time at 1.5 bar, 5 bar and 20 bar. Test-pieces are obtained with very good properties. In this way various shapes like spools, labels, packaging materials with low densities for examples for ampoules, may be produced.

EXAMPLE 5

100 parts of the granulate obtained according to Examples 1a), 1b), 2a), 2b), 2c), 3a) and 3b) are mixed in a mixer with (a) 85 parts poly-epsilon-caprolactone and (b) 120 parts poly-epsilon-caprolactone and 50 parts polyvinyl alcohol (degree of hydrolysis 88%, average molecular weight about 80'000), 50 parts ethylene-vinylalcohol-copolymer (with about 44 mol % ethylene content), 15 parts polyethylene glycol (average molecular weight: 15'000) and 5 parts sodium stearate. The mixture is treated in an extruder to form a granulate. The temperature of the melt in the extruder is kept at 165° C. The granulate with less than 9% may be processed into films or may be vacuum formed or shaped into other shaped articles.

EXAMPLE 6

The following compositions are treated analogous to Example 5 and processed into shaped articles.

TABLE 1

| Example No. | lignin/gelatine | PCL | PVOH | polymer |
|---|---|---|---|---|
| 6a | 30.5% | 30.5% | 10% | EVOH, 10% |
| 6b | 39.5% | 34.5% | 10% | EVOH, 5% |
| 6c | 30.5% | 30% | — | polyester-amide, 20% |
| 6d | 15% | 15% | 17% | EVOH, 30% |
| 6e | 30% | 50% | — | polyethylene, 4% |
| 6f | 50% | 25.5% | — | EVOH, 6.5% EAA, 5% | lignin/gelatine-reaction product, 25% gelatine (Example 6a, 6b); 40% gelatine (Example 6c, 6d); 50% gelatine (Example 6e); 60% gelatine (Example 6f), calculated to the dry substance
PCL = polycaprolactone (poly-epsilon-caprolactone)
EAA = ethylene/acrylic acid-copolymer, acrylic acid content: 10 mol %
PVOH = polyvinyl alcohol, molecular weight (MW) (i) ca. 90,000, 87 mol % degree of hydrolysis (DH) und (ii) MW ca. 108,000 DH 98–99 Mol %
EVOH = ethylene/vinyl alcohol-copolymer, ethylene content: 28 mol %
total composition = 100%
water: 4.5% (calculated to lignin/gelatine)
rest: lubricant and plasticiser (lecithin 0.5%; und Na-stearate, polyethylene glycol, glycerine)
polyesteramide = polyesteramide-copolymer

EXAMPLE 7

The following compositions are prepared an processed analogous to Example 5

TABLE 2

| Example no. | deprot. gelatine | lignin/sawdust | PVOH | polymer |
|---|---|---|---|---|
| 7a | 5.5% | 15.5%/70% | — | — |
| 7b | 4% | 18%/69% | — | — |
| 7c | 15% | 0%/72% | — | — |
| 7d | 20% | 0%/52% | 18% | — |
| 7e | 15% | 15%/58% | — | — |
| 7f | 5% | 12%/62% | 8% | EVOH, 3.5% |
| 7g | 8.5% | 25.5%/34% | 6% | PCL, 16% |
| 7h | 2.5% | 2.5%/68% | — | EAA, 3% |
| 7i | 20% | 30%/20.5% | 14% | EVOH, 5% | deprot. gelatine = deprotonated gelatine
lignin: as dry substance, organosolv or Kraft-lignin
PCL = polycaprolactone (poly-epsilon caprolactone)
EAA = ethylene/acrylic acid-copolymer, acrylic acid content: 10 mol %
EVOH = ethylene/vinyl alcohol-copolymer, ethylene content: 28 mol %,
total composition = 100%
water: 22.5%
rest: lubricant and plasticiser (lecithin 0.5%, und Na-stearate)

EXAMPLE 8

To the compositions according to Examples 6 and 7, as given in the Tables 1 and 2, are added further components such as synthetic thermoplastic polymers and copolymers, such as polyethylene, polyvinyl acetate, polyester, polyamide, ethylene/acrylic acid copolymers, ethylene/maleic-anhydride-copolymers, poly-beta-hydroxy-butyrate, poly-gamma-hydroxy-butyric acid, poly-gamma-valerolactone, each time in quantities of 5%, 10%, 15%, 20%, 30% or 40% (each time in weight percent calculated to the weight of all the components present).

What is claimed is:

1. A biodegradable composition, wherein said composition has been obtained by heating and melting together at least one lignin or a lignin containing material with a protein, and said composition contains one or more additives, whereby said additives are selected from the group consisting of modifying agents, alkenol polymers, fillers, lubricants, plasticizers, stabilizers, flame retardants, dyestuffs, nucleating agents, foaming agents, pigments and mixtures thereof, said lignin or lignin derivative reacted with said protein such that said composition contains at least one synthetic thermoplastic polymer selected from the group consisting of polyolefines; poly(vinyl acetates) and partially hydrolyzed polyvinylacetate with a degree of hydrolysis of 10 mol % to 50 mol %' polystyrene; poly(acrylic acid) esters or poly(methacrylic acid) esters; thermoplastic polycondensates; alkylene/acrylic acid copolymers or alkkylene/methacrylic acid copolymers, alkylene/maleic anhydride copolymers; and alkylene/vinylacohol copolymers.

2. A composition according to claim 1, wherein the weight ratio of the dry lignin or the dry lignin containing material to the dry protein in said composition is from about 99.95:0.05 to about 20:80.

3. The composition of claim 2, wherein the ratio is from about 99.95:0.05 to about 40:60.

4. The composition of claim 3, wherein the ratio is from about 98:2 to about 60:40.

5. The composition of claim 4, wherein the ratio is from about 97:3 to about 75:25.

6. A composition according to claim 2, wherein said composition is present in the form of a powdery mixture, a spray dried powder, a melt or a shaped article made thereof.

7. A composition according to claim 4, wherein the lignin is made from a wood selected from fir-wood, spruce, oak-tree, aspen, pine-tree and straw and is present in the form of sulfate-lignin, sulphonate-lignin, organosolv-lignin, lignin which has been treated under vapour pressure and acid-treated lignin.

8. A composition according to claim 7, wherein the lignin containing material is a wood in the form of small or fine particles.

9. A composition according to claim 7, wherein the lignin is a chemically modified lignin.

10. A composition according to claim 1, wherein the protein is a vegetable or a animal gelatine or casein or a chemically modified protein.

11. A composition according to claim 10, wherein the protein is a deprotonated protein, which been deprotonated at least about pH 8.

12. The composition of claim 11, wherein the pH is at least about pH 10.

13. The composition of claim 12, wherein the pH is at least about ph 11.5.

14. A composition according to claim 1, wherein said composition contains a synthetic biodegradable polymer.

15. A composition according to claim 1, wherein composition contains starch and/or chemically modified starch.

16. A composition according to claim 1, wherein said composition has been formed to shaped articles using a method selected from compression molding, injection molding, blow molding, extrusion or co-extrusion (rod-tube- and film-extrusion) vacuum molding.

17. A composition according to claim 16, wherein said shaped article is present in the form of an advertising article, label, cup, flower pot, spool, candle-cup, holding device, table-ware, cutlery, bottles, packaging materials, films, laminated films, sacks, bags, foams, tubes, rods, granulates or powders.

18. A composition according to claim 1, which is derived from a starting composition containing components selected from: (i) a lignin or a lignin containing material; (ii) a protein which has been deprotonated and (iii) one or more additives which are selected from the group comprising modifying agents, alkenol polymers, fillers, lubricant, plasticisers, thermoplastic polymers, stabilizers, flame retardants, dyestuffs, nucleating agents, foaming agents, pigments and mixtures thereof, wherein the weight ratio of the dry lignin and/or the dry lignin containing material to the dry protein in said composition is from about 99.95:0.05 to about 20:80.

19. A composition according to claim 1, wherein said synthetic thermoplastic polycondensate further comprises a thermoplastic polyester, a thermoplastic polyamide, a thermoplastic polyester amide or a thermoplastic poly(amide anhydride).

20. A composition according to claim 19, wherein the synthetic thermoplastic polycondensate further comprises a biodegradable polyester, a biodegradable polyamide, a biodegradable polyester amide or a biodegradable poly(amide anhydride).

21. A composition according to claim 20, wherein said biodegradable polyester is derived from aliphatic hydroxy-carbonic acids with 1 to 24 carbon atoms made from the corresponding hydroxy-carbonic acids or the corresponding lactones or lactides.

22. A composition according to claim 20, wherein said biodegradable polyester is derived from lactic acid or the corresponding lactide; beta-hydroxy-propionic acid, beta-propiolactone or beta-hydroxy-buryric acid, gamma-hydroxy-buryric acid, from gamma-butyrolactone or from gamma-valerolactone; 6-hydroxy-carbonic acid resp. epsilon-caprolactone.

23. A composition according to claim 20, wherein the biodegradable polyester is derived from lactic acid; gamma-hydroxy-butyric acid, gamma-valerolactone and/or 6-hydroxy-carbonic acid or epsilon-caprolactone.

24. A composition according to claim 20, wherein the biodegradable polyester further comprises poly(epsilon-caprolactone).

25. A composition according to claim 20, wherein said composition contains an ethylene/vinyl alcohol copolymer with a molar vinyl alcohol content of at least 50 mol %.

* * * * *